US012650890B2

(12) United States Patent
Wesley et al.

(10) Patent No.: US 12,650,890 B2
(45) Date of Patent: Jun. 9, 2026

(54) USING TRAINED MACHINE-LEARNING MODEL TO DETECT ERRORS BASED ON INTERACTIONS OF USERS OF AN ONLINE SYSTEM WITH PHYSICAL DEVICES

(71) Applicant: Maplebear Inc., San Francisco, CA (US)

(72) Inventors: Charles Wesley, San Diego, CA (US); Syed Wasi Hasan Rizvi, Toronto (CA); Brent Scheibelhut, Toronto (CA); Mark Oberemk, Toronto (CA); Naval Shah, Toronto (CA)

(73) Assignee: Maplebear Inc., San Francisco, CA (US)

( * ) Notice: Subject to any disclaimer, the term of this patent is extended or adjusted under 35 U.S.C. 154(b) by 29 days.

(21) Appl. No.: 18/890,605

(22) Filed: Sep. 19, 2024

(65) Prior Publication Data

US 2026/0079777 A1 Mar. 19, 2026

(51) Int. Cl.
| | |
|---|---|
| *G06F 11/00* | (2006.01) |
| *G06F 11/07* | (2006.01) |
| *G06Q 30/0601* | (2023.01) |

(52) U.S. Cl.
CPC ..... *G06F 11/0751* (2013.01); *G06Q 30/0603* (2013.01)

(58) Field of Classification Search
CPC .................................................. G06F 11/0751
USPC ....................................................... 714/1–57
See application file for complete search history.

(56) References Cited

U.S. PATENT DOCUMENTS

| | | | | |
|---|---|---|---|---|
| 12,341,791 B1 * | 6/2025 | DePalo | .............. | G06F 11/3466 |
| 2007/0192689 A1 * | 8/2007 | Johnson | .................. | G06F 9/542 |
| | | | | 714/46 |
| 2007/0288795 A1 * | 12/2007 | Leung | ................ | G05B 23/0275 |
| | | | | 706/46 |
| 2008/0034258 A1 * | 2/2008 | Moriya | .............. | G05B 23/0297 |
| | | | | 714/57 |
| 2011/0302192 A1 * | 12/2011 | Bariska, Jr. | ........... | G06F 11/079 |
| | | | | 714/25 |
| 2015/0213077 A1 * | 7/2015 | Hu | .......................... | G06F 16/21 |
| | | | | 707/803 |

(Continued)

OTHER PUBLICATIONS

Patent Cooperation Treaty, International Search Report and Written Opinion, PCT Patent Application No. PCT/US2025/041068, Sep. 29, 2025, 17 pages.

*Primary Examiner* — Sarai E Butler

(74) *Attorney, Agent, or Firm* — Fenwick & West LLP

(57) ABSTRACT

An online system uses a trained machine-learning model to detect errors in catalog data based on interactions of users of the online system with physical carts. Upon receiving an interaction signal indicating an interaction by the user with a device in a location of a source or an action signal indicating an action in the location of the source, the online system applies the trained model to the interaction signal and/or the action signal to generate an error score for an item that indicates a likelihood of an error in relation to the item. Responsive to the error score being above a threshold score, the online system generates an error checking signal for confirming that the error is present. Responsive to the confirmation of the error, the online system generates a user interface that alerts about the error and requests an action to correct the error.

18 Claims, 5 Drawing Sheets

(56)          References Cited

U.S. PATENT DOCUMENTS

| | | | |
|---|---|---|---|
| 2015/0245084 A1* | 8/2015 | Downing | G06Q 30/0261 |
| | | | 725/12 |
| 2016/0225043 A1* | 8/2016 | Tran | G06Q 30/0283 |
| 2017/0228811 A1 | 8/2017 | Moreau et al. | |
| 2018/0260877 A1* | 9/2018 | Li | G06Q 30/0633 |
| 2019/0318417 A1* | 10/2019 | Gumaru | G06Q 30/0635 |
| 2020/0034782 A1 | 1/2020 | Hsieh et al. | |
| 2021/0053604 A1 | 2/2021 | Gao et al. | |
| 2022/0198044 A1* | 6/2022 | Madhavan | G06Q 50/265 |
| 2022/0198640 A1* | 6/2022 | Gupte | G06F 11/0709 |
| 2022/0360637 A1* | 11/2022 | Gnanasekaran | H04L 67/025 |
| 2022/0391299 A1* | 12/2022 | Bharadwaj | G06F 11/0757 |
| 2022/0394052 A1* | 12/2022 | Grossman-Avraham | |
| | | | G06F 21/50 |
| 2023/0007023 A1* | 1/2023 | Andrabi | H04L 63/1425 |
| 2023/0132278 A1* | 4/2023 | Xiao | G06F 11/1469 |
| | | | 714/6.3 |
| 2023/0315397 A1* | 10/2023 | Prasad Tanniru | G06F 8/33 |
| 2024/0037497 A1* | 2/2024 | Brown | G06F 40/284 |
| 2024/0281817 A1 | 8/2024 | Sanzari et al. | |
| 2024/0303178 A1* | 9/2024 | Paquin | G06F 11/3608 |
| 2025/0217827 A1* | 7/2025 | Pandit | G07G 1/14 |

* cited by examiner

Smart Shopping Cart
150

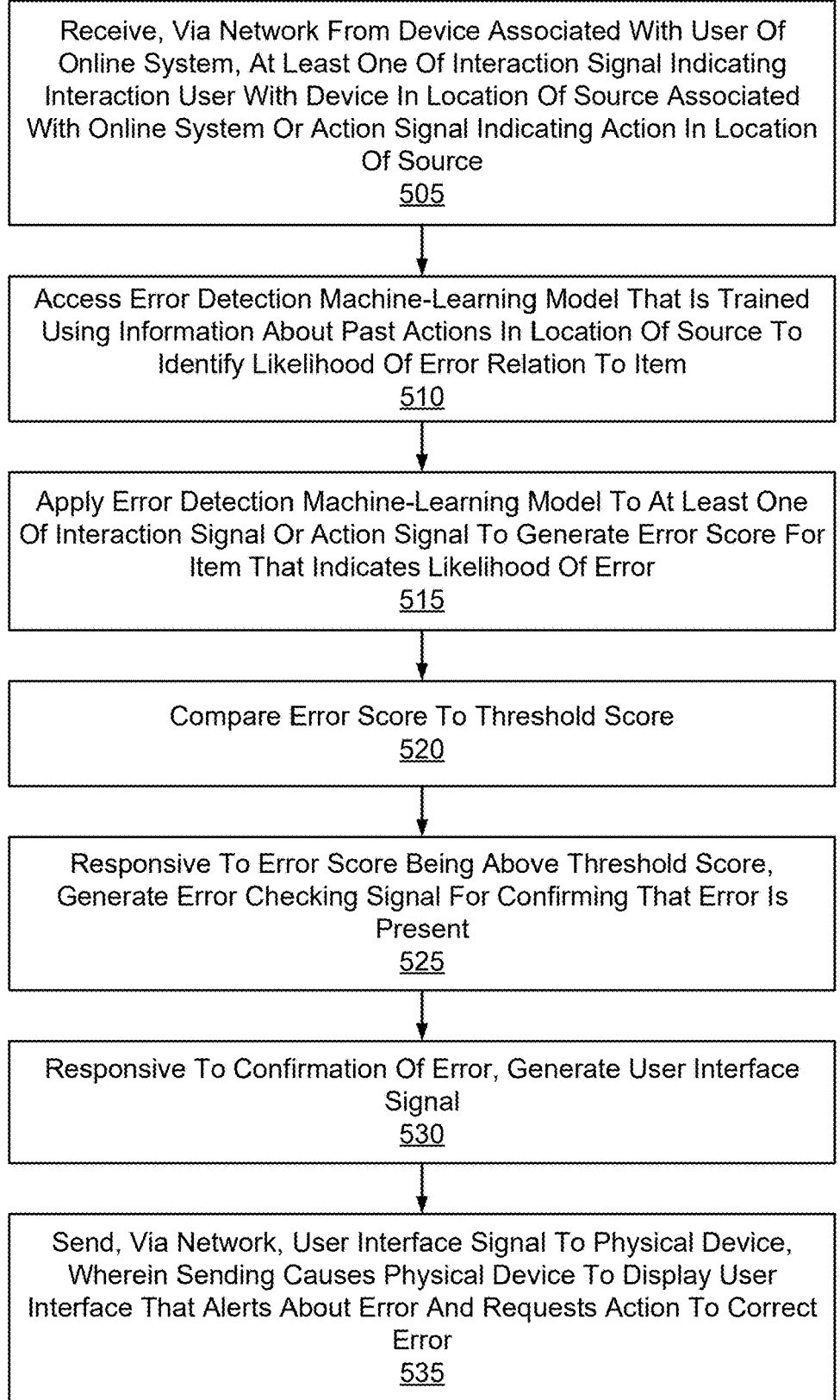

Receive, Via Network From Device Associated With User Of Online System, At Least One Of Interaction Signal Indicating Interaction User With Device In Location Of Source Associated With Online System Or Action Signal Indicating Action In Location Of Source
505

Access Error Detection Machine-Learning Model That Is Trained Using Information About Past Actions In Location Of Source To Identify Likelihood Of Error Relation To Item
510

Apply Error Detection Machine-Learning Model To At Least One Of Interaction Signal Or Action Signal To Generate Error Score For Item That Indicates Likelihood Of Error
515

Compare Error Score To Threshold Score
520

Responsive To Error Score Being Above Threshold Score, Generate Error Checking Signal For Confirming That Error Is Present
525

Responsive To Confirmation Of Error, Generate User Interface Signal
530

Send, Via Network, User Interface Signal To Physical Device, Wherein Sending Causes Physical Device To Display User Interface That Alerts About Error And Requests Action To Correct Error
535

FIG. 5

USING TRAINED MACHINE-LEARNING MODEL TO DETECT ERRORS BASED ON INTERACTIONS OF USERS OF AN ONLINE SYSTEM WITH PHYSICAL DEVICES

BACKGROUND

Smart shopping carts associated with an online system have been deployed in source locations (i.e., retail stores) to automatically detect items added to their receptacles and then facilitate the automatic checkout process. The whole idea of utilizing smart shopping carts relies on the catalog data being correct. Otherwise, if users see incorrect data when they add items to the smart shopping carts (e.g., price, item photo, item name, etc. displayed at a user interface of the smart shopping cart does not match an item added to the smart shopping cart), they will become distrustful of the system, and likely stop using smart shopping carts. The errors displayed on user interfaces of smart shopping carts can have different effects on users than errors that occur during the regular checkout flow, where users only see point-of-sale (POS) prices at the very end of the checkout flow. During the regular checkout flow, users are less likely to catch errors in POS prices (e.g., a POS price does not match a posted price in a source location) than when they are able to directly compare a price displayed on a user interface of the smart shopping cart and a price tag on a shelf in a source location.

However, there is a technical problem of how to detect, in an automatic manner and at a large scale as required by an online system associated with smart shopping carts, errors in catalog data based on interactions of users with smart shopping carts.

SUMMARY

Embodiments of the present disclosure are directed to using a trained machine-learning model of an online system to detect errors (e.g., in catalog data) based on interactions of users of the online system with physical devices (e.g., smart shopping carts).

In accordance with one or more aspects of the disclosure, the online system receives, via a network from a device associated with a user of the online system, at least one of an interaction signal indicating an interaction by the user with the device in a location of a source associated with the online system or an action signal indicating an action in the location of the source. The online system accesses an error detection machine-learning model of the online system, wherein the error detection machine-learning model is trained using information about past actions in the location of the source to identify a likelihood of an error in relation to an item. The online system applies the error detection machine-learning model to at least one of the interaction signal or the action signal to generate an error score for the item that indicates the likelihood of the error. The online system compares the error score to a threshold score. Responsive to the error score being above the threshold score, the online system generates an error checking signal for confirming that the error is present. Responsive to the confirmation of the error, the online system generates a user interface signal. The online system sends, via the network, the user interface signal to a physical device, wherein the sending causes the physical device to display a user interface that alerts about the error and requests an action to correct the error.

BRIEF DESCRIPTION OF THE DRAWINGS

FIG. 5 is a flowchart for a method of using a trained machine-learning model of an online system to detect errors in catalog data based on an interaction of a user of the online system with a physical cart, in accordance with one or more embodiments.

DETAILED DESCRIPTION

Figure 1:
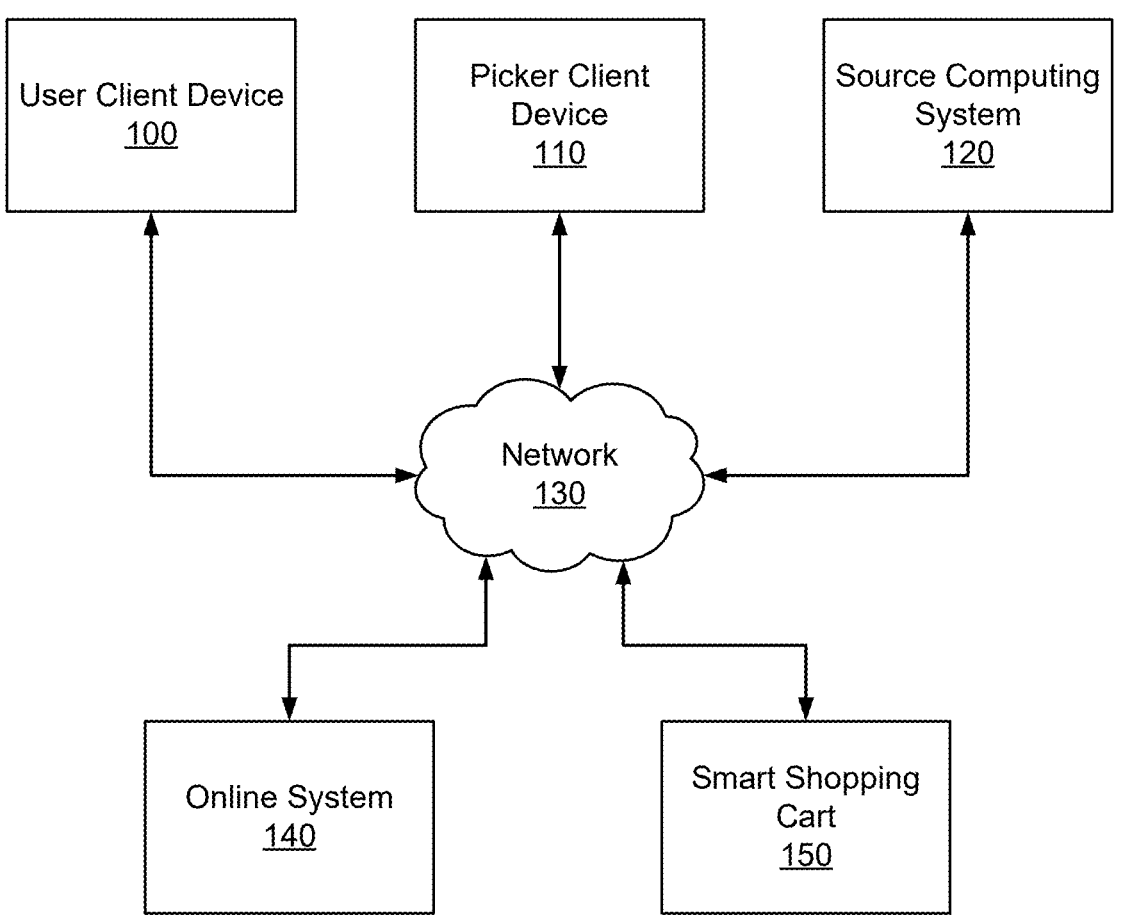
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, an online system 140, and a smart shopping cart 150. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call. A picker can be also referred to herein as a servicing agent.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with the smart shopping cart 150 being used by a user to collect items in a source location. For example, the smart shopping cart 150 may display content received from the online system 140 and may receive data describing items that are collected by the user and stored in a storage area of the shopping cart. In some embodiments, the smart shopping cart 150 is a picker client device 110 being operated by a picker collecting items within a source location. Similarly, the smart shopping cart 150 may be operated by a user within the source location collecting items for themselves. Example embodiments of smart shopping carts 150 are described in U.S. patent application Ser. No. 18/630, 672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a source location. The user's order may specify which groceries they want to be delivered from the source location and the quantities of each of the groceries. The user's client device 100 transmits the user's order to the online system 140 and the online system 140 selects a picker to travel to the source location to collect the groceries ordered by the user. The online system transmits an offer to the picker for the picker to service the order in exchange for consideration and, if the picker accepts the offer, the picker collects the groceries from the source location. Once the picker has collected the groceries ordered by the user, the picker delivers the groceries to a location transmitted to the picker client device 110 by the online system 140.

The online system 140 manages smart shopping carts 150 in source locations, where the smart shopping carts 150 automatically detect items added to the smart shopping carts 150 and then help automate the checkout process. The online system 140 presented herein uses a trained machine-learning model that detects potential errors in catalog data of the online system 140 based on signals generated by interactions of users with the smart shopping carts 150. When a likely catalog data error is detected by the machine-learning model, the online system 140 may utilize a picker task platform to confirm and/or fix errors. For example, the online system 140 can dispatch a picker to confirm a detected error, e.g., by scanning an item in a source location using the smart shopping cart 150. Any errors that are detected by the machine-learning model are corrected, and a set of parameters of the machine-learning model can be updated with the newly acquired training data based on whether detected errors were actually present.

The main goal of deploying the trained machine-learning model is to identify items in the catalog data of the online system 140 that are eroding users' trust in utilizing the smart shopping carts 150. The machine-learning model integrated in the online system 140 is trained to identify cases (i.e., items or products) where erroneous catalog data is causing users to abandon the conversion experience using smart shopping carts 150, such as by using signals of immediate cart removals, or cart abandonment events. Once an erroneous case is identified by the trained machine-learning model, the online system 140 may utilize the picker task platform to check accuracy of item data and report any issues so the detected error can be fixed. The online system 140 is described in further detail below with regards to FIG. 2.

The smart shopping cart 150 is a physical cart in a source location that enables a user of the online system 140 or a picker associated with the online system 140 to physically add (i.e., place) items from the source location into the smart shopping cart 150 and check the items out from the source location without an involvement of an employee of the source at the point of sale. The smart shopping cart 150 may be connected to the online system 140 via the network 130. During the shopping session, the smart shopping cart 150 may utilize various sensors (e.g., one or more weight sensors, one or more cameras, etc.) to gather visual data about the source location and user's/picker's shopping activity, including, but not limited to, a location of the smart shopping cart 150 in the source location, weight changes of the smart shopping cart 150 as items are added to or removed from the smart shopping cart 150, video of the user's/picker's activity in and around the smart shopping cart 150, images of items added to the smart shopping cart 150, video and/or images of shelves in the source location, video and/or images of an entrance/exit of the source location, some other visual inputs from the source location, or some combination thereof. In one or more embodiments, the smart shopping cart 150 is considered being a part of the online system 140. It should be noted that the concepts described herein in relation to the smart shopping cart 150 can be extended and/or applied to other form factors, such as a handheld shopping basket, a handheld receptacle, or some other handheld object that can be used to receive and store shopping items. The smart shopping cart 150 is described in further detail below with regards to FIG. 3.

Figure 2:
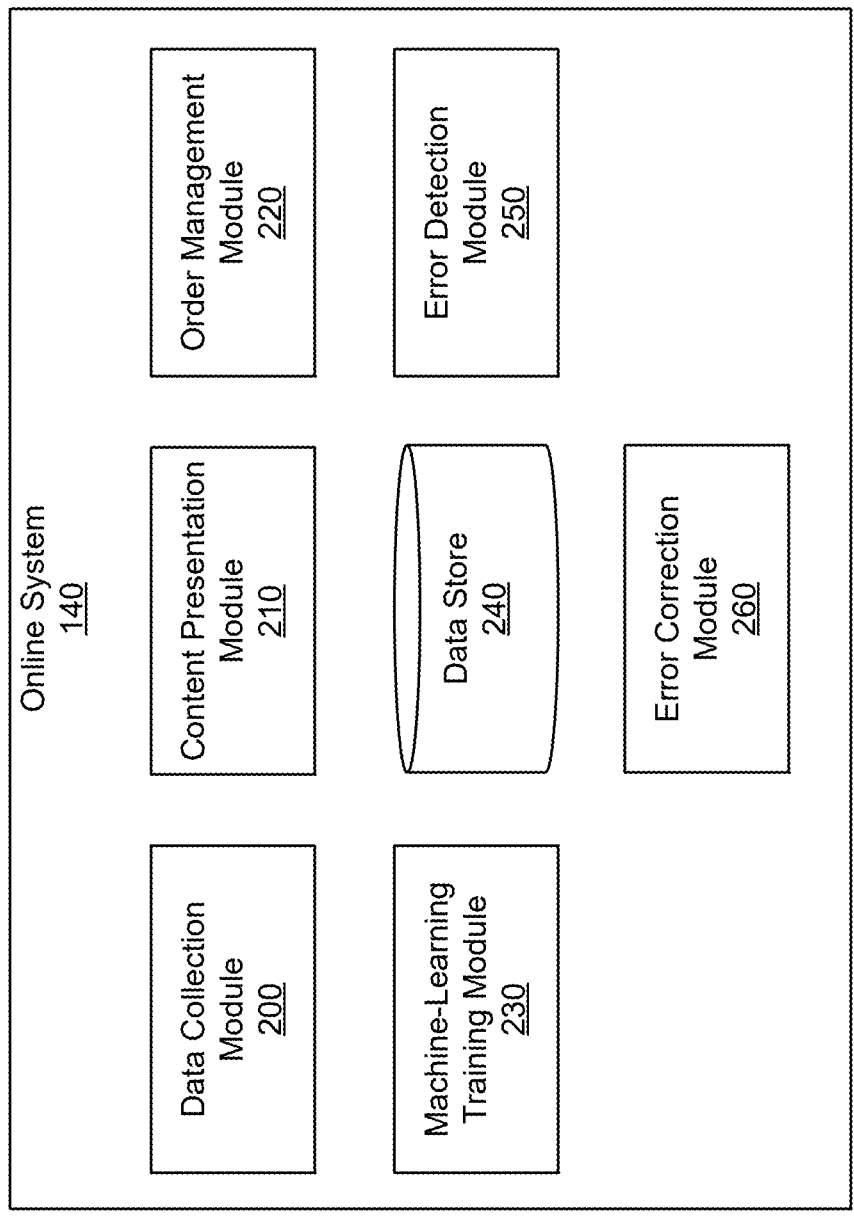
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, an error detection module 250, and an error correction module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The error detection module 250 may access an error detection model (e.g., machine-learning model) that is trained to detect whether a problem exists with catalog data (e.g., an item catalog database at the data store 240). The detected problem may be related to one or more errors for an item having their information stored in the item catalog database. The error detection module 250 may deploy the error detection model to run a machine-learning algorithm to output, based on one or more input signals (e.g., one or more signals with information about one or more user's interactions with the smart shopping cart 150), an error score for a given item that indicates a likelihood of a catalog data error (e.g., error in the item catalog database) for the given item. The error score may be a value between 0 and 1, where a higher value of the error score indicates a higher likelihood of the catalog data error. A set of parameters for the error detection model may be stored at one or more non-transitory computer-readable media of the error detection module 250. Alternatively, the set of parameters for the error detection model may be stored at one or more non-transitory computer-readable media of the data store 240.

Figure 3:
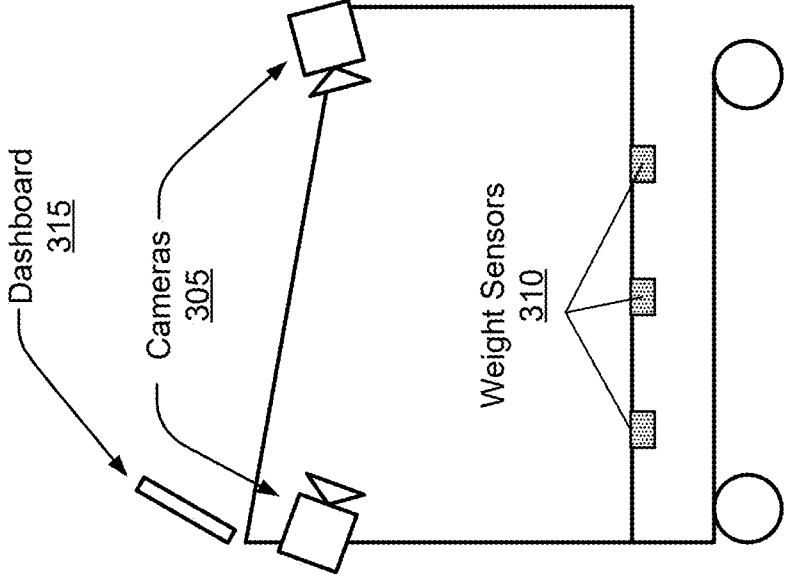
FIG. 3 illustrates an example smart shopping cart associated with an online system, in accordance with one or more embodiments.

FIG. 3 illustrates an example smart shopping cart 150 associated with the online system 140, in accordance with one or more embodiments. The smart shopping cart 150 may have one or more cameras 305 that collect video data and/or image data in relation to shelves (i.e., aisles in a source location) with various stored items as a user that utilizes the smart shopping cart 150 for shopping in the source location is passing by. The one or more cameras 305 may further collect video data and/or image data in relation to various parts of the source location. The one or more cameras 305 may further collect video data and/or image data in relation to items placed in the smart shopping cart 150, such as a weight of each item as indicated in an item label, a brand of each item, a name of each item, a price of each item, etc. Additionally, the one or more cameras 305 may collect video data and/or image data in relation to actions in and around the smart shopping cart 150, such as a location of the smart shopping cart 150 in the source location when a certain action occurs (e.g., when an item is added to the cart), user's gestures when placing items in the smart shopping cart 150, video and/or images of user's interactions with the smart shopping cart 150, track the location of the user in the source location, measure a velocity of the smart shopping cart 150 in the source location, etc. Alternatively or additionally, the smart shopping cart 150 may be equipped with one or more weight sensors 310 that measure a weight of each item placed in the smart shopping cart 150, as well as a total weight of the smart shopping cart 150 with items placed into a receptacle of the smart shopping cart 150.

The smart shopping cart 150 may further include a dashboard 315 that operates as a user interface that displays a list of items added to a receptacle of the smart shopping cart 150 and can be used for the checkout. The dashboard 315 may be further used for providing notifications to the user that utilizes the smart shopping cart 150. The smart shopping cart 150 may include additional sensors not shown in FIG. 3. The dashboard 315 or some other component of the smart shopping cart 150 may further include a computing system that is in communication, via the network 130, with the user client device 100, the picker client device 110, the source computing system 120, and/or the online system 140. Data with information about the user's interaction(s) with the smart shopping cart 150 gathered by various sensors of the smart shopping cart 150 (e.g., the cameras 305 and/or the weight sensors 310) may be uploaded via the network 130 to the online system 140 and the error detection module 250 to be used as the input signals for the error detection model.

In one or more embodiments, the error detection module 250 may provide one or more input signals (that were uploaded from the smart shopping cart 150) to the error detection model. In providing the one or more input signals to the error detection model, the error detection module 250 may provide signals related to interactions of the user with the smart shopping cart 150 in a source location, such as a signal indicating that the user added an item to the smart shopping cart 150 and then immediately removed the item from the smart shopping cart 150 (e.g., once or multiple times where the item stays removed), a signal that the user stops using the smart shopping cart 150 and never checks out after having added one or more items to the smart shopping cart 150, a signal that the user does not complete the transaction on the smart shopping cart 150 but instead only uses the smart shopping cart 150 as the traditional physical cart for the traditional checkout in a source location, one or more other signals with information about user's interactions with the smart shopping cart 150, or some combination thereof.

Note that a signal with information about having an item added to the smart shopping cart 150 and removed from the smart shopping cart 150 multiple times in a row is a strong indication for a potential error in an item catalog database, as this signal suggests the user was trying the same item over and over, hoping for a different (i.e., correct) item information (e.g., price, name, etc.) to be displayed at the dashboard 315. The signal indicating that the user stops using the smart shopping cart 150 and never checks out after having added one or more items to the smart shopping cart 150 relates to the case when the user abandons the smart shopping cart 150 immediately following addition of an item to the smart shopping cart 150. After the item is added to the smart shopping cart 150, the smart shopping cart 150 is abandoned by the user, sits dormant in a source location for some time period, and then gets emptied by an employee in the source location while the transaction is never completed using the smart shopping cart 150.

In providing the inputs signals to the error detection model, the error detection module 250 may further provide a signal indicating an action of a staff of a source in a source location, such as the price override. The price override represents a case where the staff in the source location manually adjusts the price on an item added to the smart shopping cart 150 on behalf of a user of the smart shopping cart 150. This is the equivalent of a price override at the checkout, which is applied by a staff member in a source location when a scanned item shows a price not matching the advertised price. The signal indicating the price override is a strong signal that the corresponding item is showing the wrong price data (and maybe other wrong data as well). The signal indicating the price override may be communicated from the source computing system 120 and/or the smart shopping cart 150 to the online system 140 and the error detection module 250 via the network 130.

In providing the inputs signals to the error detection model, the error detection module 250 may further provide catalog data retrieved from an item catalog database (e.g., at the data store 240). The catalog data may include labels associated with some items that are more prone to errors. Alternatively or additionally, the catalog data may include information about a name, price, taxonomy node, overall sales data, etc. for a given item that, over time, may help indicate a likelihood that the aforementioned signals are due to erroneous catalog data for the given item. For example, high-priced items and/or premium brands can be more likely to experience the aforementioned "immediate cart removal" behavior from users, even when their catalog data is accurate. Hence, the error detection model may utilize the catalog data to require more removal signals for those items before flagging them for picker review.

In providing the inputs signals to the error detection model, the error detection module 250 may further provide an identification of the smart shopping cart 150 that is currently being evaluated due to the item removal and/or the cart abandonment. For example, if there are systematically problems with a specific smart shopping cart 150, and not with other smart shopping carts in a same source location while adding same items, a signal from this specific smart shopping cart 150 may indicate that there is a problem with this specific smart shopping cart 150 and not a problem with the item catalog database. Hence, if a single smart shopping cart 150 is logging far more problems than other smart shopping carts 150 at a same source location, the corresponding cart signal may be discarded as a catalog error signal—this means instead that there is a sufficiently high likelihood that the smart shopping cart 150 itself is malfunctioning. The identification of the potential malfunctioned smart shopping cart 150 may be communicated from the smart shopping cart 150 to the online system 140 and the error detection module 250 via the network 130.

The machine-learning training module 230 may perform initial training of the error detection model using training data. The machine-learning training module 230 may generate the training data by applying a set of rules to trigger a process of checking an entry in the item catalog database for a given item. For example, if an item causes the abandonment of the smart shopping cart 150, then the machine-learning training module 230 (or the error detection module 250) can trigger checking the item's entry in the item catalog database, which then generates training data. A heuristic may be utilized to weight cart removals/abandonments and draw a threshold value, such as if an item causes cart removals/abandonments more than, e.g., 3% of the time, the checking of the item's entry in the item catalog database can be triggered automatically. The specific threshold value (e.g., initially equal to 3%) may be adjusted over time to reflect the actual threshold value that should be set. The machine-learning training module 230 may train the error detection model using the training data to generate initial values for the set of parameters of the error detection model.

The machine-learning training module 230 may collect feedback data with information about observed results when the error detection model and the online system 140 alert for a possible error with the item catalog database, including information on whether the item catalog database was actually fixed or declared to be actually correct. Additionally or alternatively, the online system 140 may prompt (e.g., via the error correction module 260) pickers associated with the online system 140 to flag issues with items for which the error detection model outputs sufficiently high likelihoods of item catalog database errors. When an item identified by the error detection model is flagged with an item catalog issue, this information is recorded into the feedback data and used for positive reinforcement. In contrast, when no issue is found for an item identified by the error detection model, this information is recorded into the feedback data and used for negative reinforcement. The machine-learning training module 230 may then re-train the error detection model by updating the set of parameters of the error detection model using the feedback data.

The error correction module 260 may confirm and/or fix potential item catalog database errors identified by the error detection model. If a potential item catalog database error is detected, the error correction module 260 may trigger a flow to confirm and/or fix the potential item catalog database error. In one or more embodiments, the error correction module 260 generates an inquiry signal to check the item catalog database online to confirm if there is a fixable error in the item catalog database. In such cases, if the fixable error in the item catalog database is confirmed, the error correction module 260 may send a message to a server of the online system 140 to fix the error in the item catalog database. Alternatively, the error correction module 260 may generate a user interface signal that is communicated, via the network 130, to the picker client device 110 and generates a user interface at the picker client device 110 prompting the picker accept an additional task (for which the picker would be compensated appropriately) when in a source location to scan a specific item and look for any errors in relation to the scanned item. Alternatively, if the detected error is related to a label in a source location, the error correction module 260 may communicate, via the network 130, an alert message to the source computing system 120 that alerts an employee in the source location to fix the error related to the label.

The online system 140 that integrates the error detection model may facilitate improvements of the item catalog database. Note that there are two different issues that can be identified in relation to the item catalog database. First, there can be product-level issues with the item catalog database. The product-level issues are issues with the product name, size, details, or photo. Because of the way the item catalog database may store data, product-level issues may be consistent across multiple source locations of a same source associated with the online system 140. The product-level issues can also be investigated remotely (e.g., via the error correction module 260) by comparing the product data in the item catalog database to the product images taken by the cameras 305 of the smart shopping carts 150.

Second, there can be item-level issues in relation to the item catalog database. The item-level issues are issues that are particular to a given source location—typically erroneous pricing details, such as an erroneous base price, erroneous loyalty price, or erroneous promotion details. The item-level issues may require traveling to the source location to verify errors. Alternatively, certain item-level issues may be verified remotely (e.g., via the error correction module 260) by comparing item data in the item catalog database against external photos of an aisle including a price tag that were taken by one or more cameras 305 of the smart shopping cart 150 at the time the item was added to the smart shopping cart 150.

When the error detection model identifies a potential error in the item catalog database for a given item or product, the error correction module 260 may trigger an action of employing a picker task platform to get pickers associated with the online system 140 involved in confirming/fixing the error in the item catalog database. The error correction module 260 may communicate, via the network 130, a notification message to the picker client device 110 prompting a picker (while offering an appropriate compensation) to go to a source location and test the experience of the smart shopping cart 150 for this item directly. Alternatively, the error correction module 260 may communicate, via the network 130, a notification message to the picker client device 110 prompting a picker (while offering an appropriate compensation) to remotely compare information in the item catalog database for this item to images of the item and the shelf taken by one or more cameras 305 of the smart shopping cart 150. In such cases, the error correction module 260 may communicate, via the network 130, a request for the picker displayed at a user interface of the picker client device 110 to flag any of the following issues in the item catalog database for a given item: incorrect item name, incorrect item photo, incorrect item brand, incorrect item size/quantity, incorrect item description, incorrect item base price, incorrect item sale price, incorrect item loyalty price, incorrect item promotion details (e.g., buy one get one, buy X get Y, etc.).

In one or more embodiments, the error correction module 260 may generate user interfaces at multiple picker client devices 110 showing to multiple pickers a same item associated with a potential catalog database error as identified by the error detection model. In such cases, the error correction module 260 may aggregate responses from the multiple pickers for better quality of confirming/fixing the potential error in the item catalog database. In general, when issues with the item catalog database are identified, internal operations of the online system 140 (e.g., performed via the error correction module 260) fix errors in the item catalog database, and the error correction module 260 may then communicate, via the network 130, to the source computing system 120 about any incorrect catalog data the source is sending over to the online system 140.

In one or more embodiments, the online system 140 with the error detection model presented herein may facilitate improvements in user interfaces of smart shopping carts 150 (e.g., user interfaces at dashboards 315). For items that the error correction module 260 identifies that do not have issues with the item catalog database, the error correction module 260 may investigate and identify any patterns that may point to usability issues of smart shopping carts 150. For example, items in "buy one get one" promotions may get removed from smart shopping carts 150 more often, because user interfaces of the smart shopping carts 150 do not leave users with confidence that the "buy one get one" promotions will be applied.

Figure 4:
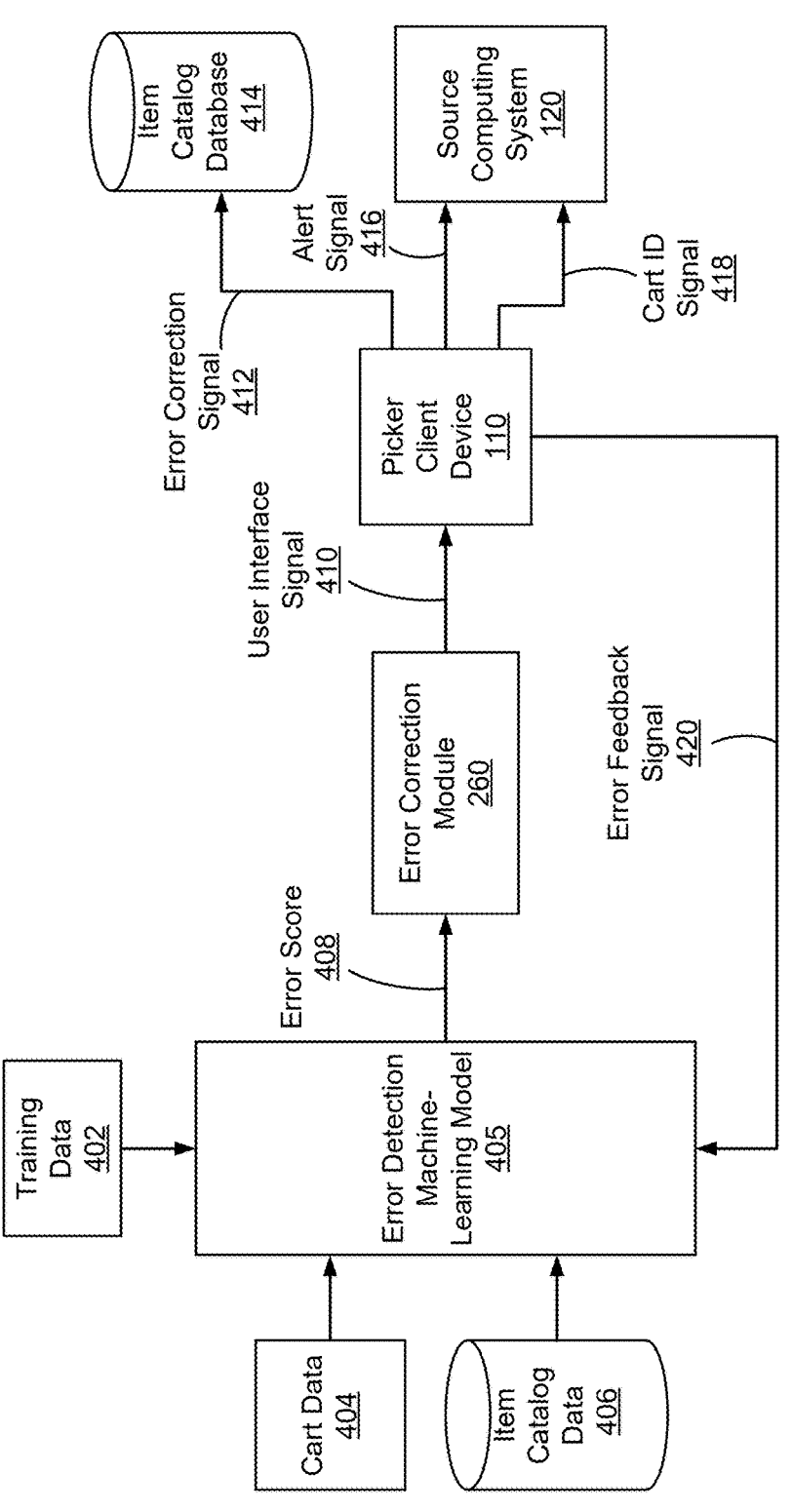
FIG. 4 illustrates an example architectural flow diagram of using a trained machine-learning model of an online system to detect errors in catalog data based on an interaction of a user of the online system with a physical cart, in accordance with one or more embodiments.

FIG. 4 illustrates an example architectural flow diagram 400 of using an error detection machine-learning model 405 of the online system 140 to detect errors in catalog data based on an interaction of a user of the online system with a physical cart, in accordance with one or more embodiments. First, the online system 140 may perform (e.g., via the machine-learning training module 230) initial training of the error detection machine-learning model 405 using training data 402 to generate initial values for the set of parameters of the error detection machine-learning model 405. The training data 402 may be generated (e.g., via the machine-learning training module 230) based on checking (after exceeding a threshold value for cart abandonments) a set of entries for a set of items in an item catalog database of the online system 140 (e.g., at the data store 240) for possible errors and collecting information about whether the errors are present. After the training process is completed, the online system 140 may provide a set of inputs to the error detection machine-learning model 405 (e.g., via the error detection module 250), such as cart data 304 and item catalog data 406. Some additional inputs not shown in FIG. 4 suitable for identifying a likelihood of an error in relation to an item may be further provided to the error detection machine-learning model 405.

In providing the set of inputs to the error detection machine-learning model 405, the error detection module 250 may further provide the cart data 304 with information about immediate item removals from the smart shopping cart 150, immediate abandonments of the smart shopping cart 150, an identification of the smart shopping cart 150 that displays erroneous item information at the dashboard 315 of the smart shopping cart 150, some other data related to user's interaction with the smart shopping cart 150, or some combination thereof. The cart data 404 may be gathered by one or more sensors of the smart shopping cart 150 (e.g., the cameras 305 and/or the weight sensors 310) and may be uploaded to the online system 140 and the error detection module 250 from the smart shopping cart via the network 130.

In providing the set of inputs to the error detection machine-learning model 405, the error detection module 250 may further provide the item catalog data 406 with information about a given item that is stored in an item catalog database (e.g., at the data store 240), such as a name of the item, type of the item, taxonomy node of the item, brand of the item, a base price for the item, some other item feature, or some combination thereof. The error detection module 250 may retrieve the item catalog data 406 from the item catalog database.

The error detection machine-learning model 405 may apply a machine-learning algorithm to the cart data 404 and the item catalog data 406 to output an error score 408 for the item that indicates a likelihood of an error in relation to the item (e.g., item database error or error in a source location). The error score 408 for the item may be passed to the error correction module 260. Responsive to the error score being above a threshold score, the error correction module 260 may generate a user interface signal 410 for generating a user interface at the picker client device 110. The user interface at the picker client device 110 generated by the user interface signal 410 may prompt a picker associated with the online system 140 to accept a task of coming to the source location to scan the item in order to confirm the detected error.

In one or more embodiments, upon scanning the item in the source location and confirming an item catalog database error in relation to the item, the picker may generate, via the picker client device 110, an error correction signal 412 for correction of the database error in an item catalog database 414 of the online system 140 (e.g., at the data store 240). The error correction signal 412 may be communicated from the picker client device 110 to the online system 140 via the network 130.

In one or more other embodiments, upon scanning the item in the source location and confirming that the error in relation to the item is either some erroneous item data in a database of the source or erroneous item label in the source location, the picker may generate, via the picker client device 110, an alert signal 416 for notifying the source about the erroneous item data. The alert signal 416 may be communicated from the picker client device 110 to the source computing system 120 via the network 130.

In one or more other embodiments, upon scanning the item in the source location (e.g., via the picker client device 110) and confirming that there is no error in relation to the item but a user interface of the smart shopping cart 150 is likely to malfunctioning, the picker may generate, via the picker client device 110, a cart ID signal 418 with information for the source about an identification of the possibly malfunctioning smart shopping cart 150. The cart ID signal 418 may be communicated from the picker client device 110 to the source computing system 120 (and, optionally, to the smart shopping cart 150 itself) via the network 130.

The picker client device 110 may record an error feedback signal 420 with information about what items had actual issues, i.e., for which item an error has been confirmed and for which item an error has not been confirmed. The online system 140 may receive (e.g., via the machine-learning training module 230) the error feedback signal 420 from the picker client device 110 via the network 130. The machine-learning training module 230 may utilize the error feedback signal 420 to re-train the error detection machine-learning model 405. By utilizing the error feedback signal 420, the machine-learning training module 230 may update the set of parameters of the error detection machine-learning model 405 and continuously improve the machine-learning algorithm of the error detection machine-learning model 405.

FIG. 5 is a flowchart for a method of using a trained machine-learning model of an online system to detect errors in catalog data based on an interaction of a user of the online system with a physical cart, in accordance with one or more embodiments. Alternative embodiments may include more, fewer, or different steps from those illustrated in FIG. 5, and the steps may be performed in a different order from that illustrated in FIG. 5. These steps may be performed by an online system (e.g., the online system 140). Additionally, each of these steps may be performed automatically by the online system without human intervention.

The online system 140 receives 505 (e.g., at the error detection module 250), via a network (e.g., the network 130) from a device associated with a user of the online system 140 (e.g., the smart shopping cart 150), at least one of an interaction signal indicating an interaction by the user with the device in a location of a source or an action signal indicating an action in the location of the source.

The online system 140 may gather, via one or more sensors mounted to the device (e.g., the cameras 305 and/or the weight sensors 310), sensor data with an indication that the user added the item to a physical receptacle of the device that is each time followed by removing the item from the physical receptacle. The online system 140 may then receive (e.g., at the error detection module 250), from the device and via the network, the interaction signal including the gathered sensor data.

The online system 140 may gather, via one or more sensors mounted to the device (e.g., the cameras 305 and/or the weight sensors 310), sensor data with an indication that the user failed to complete a conversion session in the source location using the device after adding one or more items to a physical receptacle of the device. The online system 140 may then receive, from the device and via the network, the interaction signal including the gathered sensor data.

The online system 140 accesses 510 an error detection machine-learning model of the online system 140 (e.g., via the error detection module 250), wherein the error detection machine-learning model is trained using information about past actions in the location of the source to identify a likelihood of an error in relation to an item. The online system applies 515 the error detection machine-learning model (e.g., via the error detection module 250) to at least one of the interaction signal or the action signal to generate an error score for the item that indicates the likelihood of the error.

The online system 140 may receive (e.g., at the error detection module 250), from the device and via the network, an identification signal a plurality of times over a time period, the identification signal including an identification of the device, wherein a user interface of the device (e.g., the dashboard 315) includes erroneous information about different items during the time period. The online system 140 may then apply the error detection machine-learning model (e.g., via the error detection module 250) further to the identification signal to generate the error score for the item.

The online system 140 may retrieve (e.g., via the error detection module 250), from a database of the online system 140 (e.g., catalog of items in the data store 240), information about an entry of the item in the database. The online system 140 may then apply the error detection machine-learning model (e.g., via the error detection module 250) further to the retrieved information to generate the error score for the item.

The online system 140 may receive (e.g., at the error detection module 250), from the device and via the network, the action signal including an indication that at least a portion of an entry of an item in the database (e.g., item price) was updated upon the action in the location of the source (e.g., price being overridden by an employee at the location of the source). The online system 140 may apply the error detection machine-learning model (e.g., via the error detection module 250) to output the error score that indicates the likelihood of the error in relation to the entry of the item in the database.

The online system 140 compares 520 (e.g., via the error correction module 260) the error score to a threshold score. Responsive to the error score being above the threshold score, the online system 140 generates 525 (e.g., via the error correction module 260) an error checking signal for confirming that the error is present. Responsive to the confirmation of the error, the online system 140 generates 530 (e.g., via the error correction module 260 or the content presentation module 210) a user interface signal. The online system 140 sends 535, via the network, the user interface signal to a physical device (e.g., the picker client device 110, the source computing system 120, or a server device of the online system 140), wherein the sending causes the physical device to display a user interface that alerts about the error and requests an action to correct the error.

The online system 140 may generate (e.g., via the error correction module 260) the error checking signal for confirming that the entry of the item in the database is erroneous. Responsive to the confirmation that the entry of the item in the database is erroneous, the online system 140 may generate (e.g., via the error correction module 260) the user interface signal that causes the physical device to display the user interface with a message prompting the action to correct the error in the entry of the item in the database. Alternatively, the online system 140 may send (e.g., via the error correction module 260 or the content presentation module 210) the user interface signal to physical device associated a servicing agent (e.g., the picker client device 110), wherein the sending causes the physical device associated with the servicing agent to display the user interface that prompts the servicing agent to accept a task of coming to the location of the source to scan the item for confirming the error.

The online system 140 may apply the error detection machine-learning model (e.g., via the error detection module 250) to output the error score that indicates the likelihood of the error in relation to a label of the item in the location of the source. The online system 140 may then send (e.g., via the error correction module 260 or the content presentation module 210) the user interface signal to the physical device associated with the source (e.g., the source computing system 120), wherein the sending causes the physical device associated with the source to display the user interface with a message prompting the source to perform the action to correct the error in relation to the label.

The online system 140 may receive (e.g., at the error detection module 250), from a plurality of devices associated with users of the online system 140 (e.g., smart shopping carts 150) and via the network, the information about past actions in the source location including signals with information about abandonments of the plurality of devices for conversions by the users upon placement of a set of one or more items to physical receptacles of the plurality of devices. Responsive to the received signals, the online system 140 may check (e.g., via the error correction module 260) a set of one or more entries of the set of one or more items in the database for one or more errors in the set of one or more entries. The online system 140 may then generate (e.g., via the machine-learning training module 230) training data based on information about whether the one or more errors are present. The online system 140 may train (e.g., via the machine-learning training module 230), using the training data, the error detection machine-learning model to generate a set of initial values for the set of parameters of the error detection machine-learning model.

The online system 140 may collect (e.g., via the machine-learning training module 230) feedback data with information about results of checking a plurality of errors for a collection of items that is performed responsive to error scores for the plurality of errors output by the error detection machine-learning model being above the threshold score. The online system 140 may re-train the error detection machine-learning model by updating (e.g., via the machine-learning training module 230), using the collected feedback data, the set of parameters of the error detection machine-learning model.

Embodiments of the present disclosure are directed to the online system 140 that utilizes a trained machine-learning model to detect an error in item catalog data for an item based on an interaction of a user of the online system 140 with a physical cart (e.g., the smart shopping cart 150). An error score above a threshold score output by the trained machine-learning model triggers a process of checking whether the error actually exists. If the error is confirmed, the online system 140 generates a user interface that alerts about the error and calls for an action to correct the error.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving, via a network and from a device associated with a user of the computer system, an interaction signal including information about an interaction by the user with an item associated with a source and the device in a location of the source;

accessing an error detection model, wherein the error detection model is a machine-learning model trained using information about past actions in the location of the source to identify a likelihood of an error in relation to an entry of the item in a database of the computer system;

applying the error detection model to the interaction signal including the information about the interaction by the user with the item and the device to generate an error score for the item that indicates the likelihood of the error in relation to the entry of the item in the database;

comparing the error score to a threshold score;

responsive to the error score being above the threshold score, generating an error checking signal for confirming that the error is present;

responsive to confirming that the error is present, generating a user interface signal; and sending, via the network, the user interface signal to a physical device, wherein sending the user interface signal causes the physical device to display a user interface that alerts about the error and requests an action to correct the error.

2. The method of claim 1, wherein receiving the interaction signal comprises:

gathering, via one or more sensors mounted to the device, sensor data with an indication that the user added the item to a physical receptacle of the device that is each time followed by removing the item from the physical receptacle; and receiving, from the device and via the network, the interaction signal including the gathered sensor data.

3. The method of claim 1, wherein receiving the interaction signal comprises:

gathering, via one or more sensors mounted to the device, sensor data with an indication that the user failed to complete a conversion session in the location of the source using the device after adding one or more items to a physical receptacle of the device; and receiving, from the device and via the network, the interaction signal including the gathered sensor data.

4. The method of claim 1, further comprising:

receiving, from the device and via the network, an identification signal a plurality of times over a time period, the identification signal including an identification of the device, wherein a user interface of the device includes erroneous information about different items during the time period, wherein applying the error detection model comprises applying the error detection model further to the identification signal to generate the error score for the item.

5. The method of claim 1, further comprising:

retrieving, from the database, information about an entry of the item in the database, wherein applying the error detection model comprises applying the error detection model further to the retrieved information to generate the error score for the item.

6. The method of claim 1, further comprising:

receiving, from the device and via the network, an action signal including an indication that at least a portion of the entry of the item in the database was updated upon an action in the location of the source, wherein applying the error detection model comprises applying the error detection model further to the action signal to generate the error score for the item.

7. The method of claim 1, wherein:

generating the error checking signal comprises generating the error checking signal for confirming that the entry of the item in the database is erroneous; and responsive to confirming that the entry of the item in the database is erroneous, generating the user interface signal that causes the physical device to display the user interface with a message prompting the action to correct the error in the entry of the item in the database.

8. The method of claim 1, wherein sending the user interface signal comprises:

sending, via the network, the user interface signal to the physical device associated a servicing agent, wherein sending the user interface signal causes the physical device associated with the servicing agent to display the user interface that prompts the servicing agent to accept a task of coming to the location of the source to scan the item for confirming the error.

9. The method of claim 1, further comprising:

applying the error detection model to the interaction signal to generate a second error score that indicates a likelihood of an error in relation to a label of the item in the location of the source; and sending, via the network, a second user interface signal to the physical device associated with the source, wherein sending the second user interface signal causes the physical device associated with the source to display the user interface with a message prompting the source to perform an action to correct the error in relation to the label.

10. The method of claim 1, further comprising:

receiving, from a plurality of devices associated with users of the computer system and via the network, the information about past actions including signals with information about abandonments of the plurality of devices for conversions by the users upon placement of a set of one or more items to physical receptacles of the plurality of devices;

responsive to receiving the signals, checking a set of one or more entries of the set of one or more items in the database for one or more errors in the set of one or more entries;

generating training data using information about whether the one or more errors are present; and training, using the training data, the error detection model to generate a set of initial values for a set of parameters of the error detection model.

11. The method of claim 1, further comprising:

collecting feedback data with information about results of checking a plurality of errors for a collection of items that is performed responsive to error scores for the plurality of errors generated by the error detection model being above the threshold score; and re-training the error detection model by updating, using the collected feedback data, a set of parameters of the error detection model.

12. A computer program product comprising a non-transitory computer readable storage medium having instructions encoded thereon that, when executed by a processor, cause the processor to perform steps comprising:

receiving, via a network and from a device associated with a user of a computer system, an interaction signal including information about an interaction by the user with an item associated with a source and the device in a location of the source;

accessing an error detection model, wherein the error detection model is a machine-learning model trained using information about past actions in the location of the source to identify a likelihood of an error in relation to an entry of the item in a database of the computer system;

applying the error detection model to the interaction signal including the information about the interaction by the user with the item and the device to generate an error score for the item that indicates the likelihood of the error in relation to the entry of the item in the database;

comparing the error score to a threshold score;

responsive to the error score being above the threshold score, generating an error checking signal for confirming that the error is present;

responsive to confirming that the error is present, generating a user interface signal; and sending, via the network, the user interface signal to a physical device, wherein sending the user interface signal causes the physical device to display a user interface that alerts about the error and requests an action to correct the error.

13. The computer program product of claim 12, wherein the instructions further cause the processor to perform steps comprising:

gathering, via one or more sensors mounted to the device, sensor data with an indication that the user added the item to a physical receptacle of the device that is each time followed by removing the item from the physical receptacle; and receiving, from the device and via the network, the interaction signal including the gathered sensor data.

14. The computer program product of claim 12, wherein the instructions further cause the processor to perform steps comprising:

gathering, via one or more sensors mounted to the device, sensor data with an indication that the user failed to complete a conversion session in the location of the source using the device after adding one or more items to a physical receptacle of the device; and receiving, from the device and via the network, the interaction signal including the gathered sensor data.

15. The computer program product of claim 12, wherein the instructions further cause the processor to perform steps comprising:

generating the error checking signal comprises generating the error checking signal for confirming that the entry of the item in the database is erroneous; and responsive to confirming that the entry of the item in the database is erroneous, generating the user interface signal that causes the physical device to display the user interface with a message prompting the action to correct the error in the entry of the item in the database.

16. The computer program product of claim 12, wherein the instructions further cause the processor to perform steps comprising:

sending, via the network, the user interface signal to the physical device associated a servicing agent, wherein sending the user interface signal causes the physical device associated with the servicing agent to display the user interface that prompts the servicing agent to accept a task of coming to the location of the source to scan the item for confirming the error.

17. The computer program product of claim 12, wherein the instructions further cause the processor to perform steps comprising:

receiving, from a plurality of devices associated with users of the computer system and via the network, the information about past actions including signals with information about abandonments of the plurality of devices for conversions by the users upon placement of a set of one or more items to physical receptacles of the plurality of devices;

responsive to receiving the signals, checking a set of one or more entries of the set of one or more items in the database for one or more errors in the set of one or more entries;

generating training data using information about whether the one or more errors are present;

training, using the training data, the error detection model to generate a set of initial values for a set of parameters of the error detection model;

collecting feedback data with information about results of checking a plurality of errors for a collection of items that is performed responsive to error scores for the plurality of errors generated by the error detection model being above the threshold score; and re-training the error detection model by updating, using the collected feedback data, the set of parameters of the error detection model.

18. A computer system comprising:

a processor; and a non-transitory computer-readable storage medium having instructions that, when executed by the processor, cause the computer system to perform steps comprising:

receiving, via a network and from a device associated with a user of the computer system, an interaction signal including information about an interaction by the user with an item associated with a source and the device in a location of the source;

accessing an error detection, wherein the error detection model is a machine-learning model trained using information about past actions in the location of the source to identify a likelihood of an error in relation to an entry of the item in a database of the computer system;

applying the error detection model to the interaction signal including the information about the interaction by the user with the item and the device to generate an error score for the item that indicates the likelihood of the error in relation to the entry of the item in the database;

comparing the error score to a threshold score;

responsive to the error score being above the threshold score, generating an error checking signal for confirming that the error is present;

responsive to confirming that the error is present, generating a user interface signal; and sending, via the network, the user interface signal to a physical device, wherein sending the user interface signal causes the physical device to display a user interface that alerts about the error and requests an action to correct the error.

* * * * *